United States Patent [19]
Yamaguchi et al.

[11] Patent Number: 5,373,886
[45] Date of Patent: Dec. 20, 1994

[54] PAIR OF PNEUMATIC RADIAL FRONT AND REAR TIRES HAVING SPECIFIED AUXILIARY BELT STRUCTURES

[75] Inventors: Yutaka Yamaguchi, Urawa; Katsuhiko Kinoshita, Kodaira, both of Japan

[73] Assignee: Bridgestone Corporation, Tokyo, Japan

[21] Appl. No.: 104,001

[22] Filed: Aug. 10, 1993

Related U.S. Application Data

[63] Continuation of Ser. No. 904,333, Jun. 25, 1992, abandoned.

[30] Foreign Application Priority Data

Jun. 26, 1991 [JP] Japan .................. 3-180604

[51] Int. Cl.$^5$ .............. B60C 9/18; B60C 9/20
[52] U.S. Cl. .................. 152/531; 152/526; 152/527; 152/533; 152/536
[58] Field of Search .................. 152/526–527, 152/529, 531, 533, 536

[56] References Cited

U.S. PATENT DOCUMENTS

| | | | |
|---|---|---|---|
| 4,869,307 | 9/1989 | Bormann et al. | 152/533 |
| 4,924,927 | 5/1990 | Kawabata et al. | 152/531 |
| 5,076,336 | 12/1991 | Watanabe et al. | 152/533 |

FOREIGN PATENT DOCUMENTS

| | | | |
|---|---|---|---|
| 1473029 | 12/1965 | France . | |
| 3908707 | 3/1989 | Germany . | |
| 60-67201 | 4/1985 | Japan | 152/526 |
| 2246804 | 10/1990 | Japan | 152/533 |
| 3204306 | 9/1991 | Japan | 152/533 |

OTHER PUBLICATIONS

*Pneumatic Tire Design*, E. C. Woods; W. Heffer & Sons, Ltd., Cambridge, England (UK), 1952, p. 32.
*Rubber Tires And All About Them*, Henry Pearson: India Rubber Publishing Co., New York, 1906, pp. 28–29.
European Search Report dated October 21, 1992.

*Primary Examiner*—Caleb Weston
*Assistant Examiner*—Adrienne L. Johnstone
*Attorney, Agent, or Firm*—Sughrue, Mion, Zinn, Macpeak & Seas

[57] ABSTRACT

A steering stability in a pair of pneumatic radial front and rear tires is considerably improved without sacrificing the tire durability by making a circumferential rigidity of an auxiliary belt in the front tire at a portion corresponding to a central zone of a belt in widthwise direction thereof larger than that of an auxiliary belt in a rear tire at the portion corresponding to the central zone of the belt in widthwise direction thereof.

10 Claims, 2 Drawing Sheets

FIG_1a
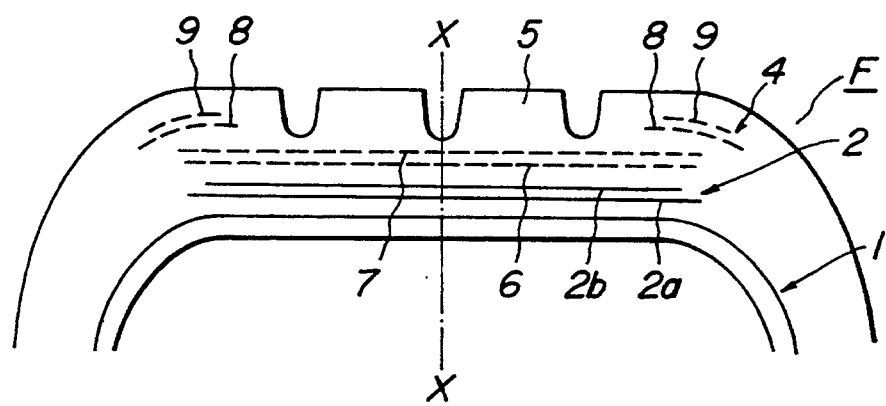
FIG_1b
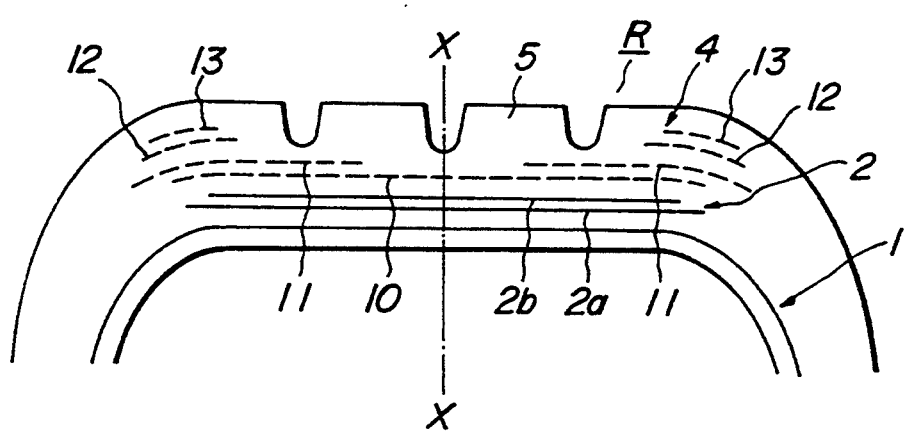

FIG_2a
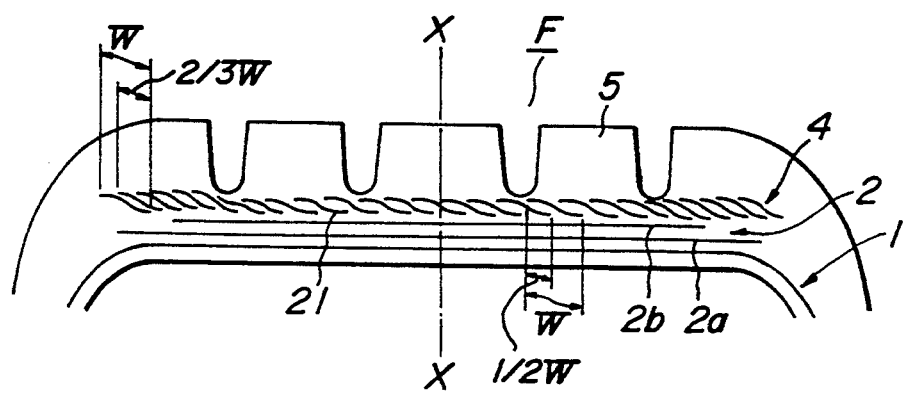
FIG_2b
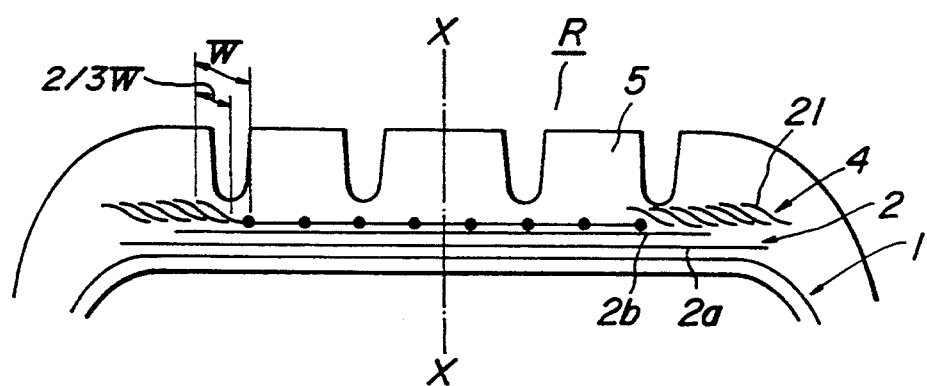

PAIR OF PNEUMATIC RADIAL FRONT AND REAR TIRES HAVING SPECIFIED AUXILIARY BELT STRUCTURES

This is a continuation of application No. 07/904,333 filed Jun. 25, 1992 now abandoned.

BACKGROUND OF THE INVENTION

1. Field of the Invention

This invention relates to a pair of pneumatic radial front and rear tires, and more particularly to a pair of pneumatic radial front and rear tires having improved steering stability by clearly separating function of each tire.

2. Disclosure of the Related Art

With the advance of performance in vehicles, there are recently developed vehicles running at a speed of more than 300 km/hr. As a result, pneumatic radial tires used for such a vehicle are strongly demanded to have not only high-speed durability but also a high steering stability inclusive of cornering performance.

For this purpose, it is attempted to separate the functions of front and rear tires by making the width of the front tire relatively narrow and a width of the rear tire wide to provide improved response from the front tire and improved road gripping force from the rear tire. By such a technical development, the steering stability is improved to a certain level.

However, the demand on the performances of a super-high performance tire, particularly steering stability is boundless, and the severity of such a demand is increasing even at the present time. Consequently, it is impossible to improve the steering stability of the tire to a level sufficiently satisfying the above demand only by differing the tire widths of the front and rear tires while maintaining substantially the same reinforcing structure between the front and rear tires as in the above conventional technique.

SUMMARY OF THE INVENTION

It is, therefore, an object of the invention to provide a pair of pneumatic radial front and rear tires having a steering stability considerably improved by further pushing the separation of function between the front and rear tires, particularly a pair of pneumatic radial front and rear tires having improved response through the front tire and improved road gripping force through the rear tire without sacrificing the high-speed durability of the tire.

According to the invention, it is noticed that the rigidity of the tire at a central zone of a tread in widthwise direction thereof particularly has a large influence upon the response of the front tire and the road gripping force of the rear tire. As a result, the invention is based on the knowledge that the rigidity of the tire at such a central zone can easily be adjusted as is expected only by changing the structure of the known auxiliary belt arranged adjacent to the outer peripheral side of the primary belt for ensuring the high-speed durability of the tire.

According to the invention, there is the provision of a pair of pneumatic radial front and rear tires having different sizes, particularly different tire widths, each of the tires comprising a carcass of a radial structure toroidally extending between a pair of bead rings, a primary belt arranged at an outer peripheral side of a crown portion of the carcass and comprised of plural belt layers each containing inextensible cords arranged at a relatively small cord angle with respect to an equatorial plane of the tire, and an auxiliary belt arranged adjacent to an outer peripheral side of the primary belt and comprised of at least one reinforcing layer containing organic fiber cords arranged substantially in parallel with the equatorial plane of the tire, characterized in that a circumferential rigidity of the auxiliary primary belt in the front tire at a portion corresponding to a central zone of the primary belt in widthwise direction thereof is made larger than that of the auxiliary belt in the rear tire at a portion corresponding to a central zone of the primary belt in widthwise direction thereof.

The term "portion corresponding to a central zone of the belt in widthwise direction thereof" used herein generally means exclusion of portions corresponding to both side portions of the belt in the widthwise direction, but this meaning is not so strict. That is, this term means a portion of the auxiliary belt corresponding to the neighboring zone about the center of the belt.

Further, the term "circumferential rigidity" used herein means a sum of strengths of cords per unit width (e.g. per width of 1 cm). Therefore, the circumferential rigidity of the auxiliary belt can properly be changed by selecting material of cord, size of cord, twisting structure of cord, end count of cords and the like.

As an embodiment of the tire pair according to the invention, when the auxiliary belt is formed by spirally winding a ribbon-shaped reinforcing rubberized strip containing plural organic fiber cords therein, an overlapping amount of the strip to be spirally wound as the auxiliary belt of the front tire at a portion corresponding to the central zone of the belt in the widthwise direction is made larger than an overlapping amount of the strip to be spirally wound as the auxiliary belt of the rear tire at a portion corresponding to the central zone of the belt in the widthwise direction.

In the latter case, the overlapping amount of the strip in the rear tire includes zero.

In the tire pair according to the invention, it is preferable that the circumferential rigidity of the auxiliary belt in the front tire at the portion corresponding to the central zone of the belt in the widthwise direction is made larger by 1.5–3.0 times than that in the rear tire. Thus, the rigidity of the tire inclusive of tread and belt as a whole in the front tire at the widthwise central zone thereof can sufficiently be increased as compared with that in the rear tire, whereby the responsibility of the front tire can be enhanced and particularly the cornering performance can advantageously be improved.

On the other hand, the rigidity of the rear tire at the portion corresponding to the central zone of the belt in the widthwise direction is made smaller than that in the front tire, so that the ground contact property is improved and hence the road gripping force is effectively improved.

In the invention, therefore, the functions of the front tire and the functions of the rear tire are more clearly separated, whereby the steering stability of the tire and hence the vehicle is largely improved irrespective of dry road surface and wet road surface.

Even when the auxiliary belt of the tire is formed by spiral winding of the ribbon-shaped reinforcing rubberized strip, since the overlapping amount of the strip in the front tire at the portion corresponding to the central zone of the belt is larger than that in the rear tire, the total rigidity of the tire inclusive of tread and belt in the front tire at the widthwise central zone thereof can sufficiently be increased as compared with that in the rear tire, while the rigidity of the rear tire at the portion corresponding to the central zone of the belt in the widthwise direction is made smaller than that in the front tire, whereby the function between the front and rear tires can sufficiently be separated to largely improve the steering stability likewise the above case.

BRIEF DESCRIPTION OF THE DRAWINGS

The invention will be described with reference to the accompanying drawings, wherein:

FIGS. 1a and 1b are schematically sectional views of crown portions of front and rear tire pair in a first embodiment of the invention, respectively; and FIGS. 2a and 2b are schematically sectional views of crown portions of front and rear tire pair in a second embodiment of the invention, respectively.

DESCRIPTION OF THE PREFERRED EMBODIMENT

In FIG. 1 is schematically shown a section of a crown portion in a first embodiment of the tire pair according to the invention, in which FIG. 1a shows a front tire F and FIG. 1b shows a rear tire R.

In both the tires, a radial carcass 1 comprised of at least one carcass ply containing carcass ply cords arranged at a cord angle of substantially 90° with respect to an equatorial plane X—X of the tire toroidally extended between a pair of bead rings (not shown). A primary 2 belt comprised of two belt layers 2a and 2b is arranged at a side of an outer peripheral surface of a crown portion of the radial carcass 1. Each of these belt layers 2a and 2b contains inextensible cords such as steel cords or the like arranged at a relatively small cord angle with respect to the equatorial plane X—X of the tire. The cords of the layers are crossed with each other. Furthermore, an auxiliary belt 4 comprised of at least one reinforcing layer containing organic fiber cords such as nylon cords or the like arranged substantially in parallel with the equatorial plane X—X is arranged at an outer peripheral side of the primary belt 2 to cover the belt 2 over a full width thereof. A tread 5 is arranged at an outer peripheral side of the auxiliary belt 4.

In the tire of FIG. 1a designated as a front tire (there is on the tire some indication (not shown) that the tire is to be mounted on the front of a vehicle), the auxiliary belt 4 comprises inner and outer reinforcing layers 6, 7 extending over the full width of the belt 2, and two pairs of reinforcing layer sections 8, 9 each arranged on the outer reinforcing layer 7 at a position corresponding to each side edge portion of the belt 2 and somewhat extending over the side edge of the belt 2 toward a side of a sidewall portion.

In the rear tire of FIG. 1b designated as a rear tire (there is on the tire some indication (not shown) that the tire is to be mounted on the rear of a vehicle), the auxiliary belt 4 comprises a reinforcing layer 10 extending over the full width of the belt 2, an intermediate reinforcing layer 11 arranged on an outer peripheral side of the reinforcing layer 10 so as to cut out a portion from the layer 11 at a position corresponding to a central zone of the belt 2 in its widthwise direction, and two pairs of reinforcing layer sections 12, 13 each arranged on the intermediate reinforcing layer 11 at a region corresponding to each side end zone of the belt 2 and somewhat extending over the side end of the belt 2 toward a side of a sidewall portion.

In the tire pair of FIG. 1, therefore, the circumferential rigidity of the auxiliary belt 4 in the front tire F at a portion corresponding to the central zone of the belt 2 in the widthwise direction is larger by a quantity corresponding to the reinforcing layer 7 than the circumferential rigidity of the auxiliary belt 4 in the rear tire R at a portion corresponding to the central zone of the belt 2. For example, when the circumferential rigidity of the front tire F is 100, the circumferential rigidity of the rear tire R is 50.

Although the difference in the circumferential rigidity between the front tire F and the rear tire R in the above embodiment is created by varying the number of the reinforcing layers arranged at the portion corresponding to the central zone of the belt 2 in the widthwise direction, such a difference in the circumferential rigidity can naturally be obtained by varying the material and/or size of cords constituting the reinforcing layer, or by varying the twisting structure of the cord or the end count of the cords in the reinforcing layer. Moreover, it is preferable that the circumferential rigidity of the auxiliary belt at the region corresponding to the side end zone of the belt 2 in the rear tire is larger than that in the front tire and that the circumferential rigidity of the auxiliary belt at the region corresponding to the side end zone of the belt 2 is larger than that at the portion corresponding to the central zone of the belt 2 irrespective of the front and rear tires.

According to the above embodiment of the tire pair, the rigidity of the front tire F at the portion corresponding to the central zone of the belt 2 in the widthwise direction becomes relatively high, while the rigidity of the rear tire R at the portion corresponding to the central zone of the belt 2 becomes relatively low. As a result the cornering performance of the front tire F and the road gripping force of the rear tire R are effectively improved to largely enhance the steering stability.

In FIG. 2 is schematically shown a section of a crown portion in a second embodiment of the tire pair according to the invention, in which FIG. 2a shows a front tire F and FIG. 2b shows a rear tire R. In this case, the auxiliary belt 4 is formed by spirally winding a ribbon-shaped reinforcing rubberized strip 21 containing plural organic fiber cords such as nylon cords or the like therein on the outer peripheral side of the belt 2, in which the overlapping amount of the strip 21 is different between the front tire F and the rear tire R.

In the front tire F of FIG. 2a, when the ribbon-shaped reinforcing strip 21 having a certain width W is formed by embedding in rubber, rubbery elastomer or the like plural organic fiber cords extending in parallel with each other or extending wavy in the circumferential direction and spirally wound on the outer peripheral side of the belt 2, the ribbon-shaped reinforcing strip 21 is overlapped at a width corresponding to ⅔ of the strip width W in a region corresponding to each side end zone of the belt 2 in the widthwise direction. The ribbon-shaped strip 21 is over-lapped at a width corresponding to ⅓ of the strip width W in a portion corresponding to a central zone of the belt 2 in the widthwise direction. On the other hand, in the rear tire R of FIG. 2b, the overlapping amount of the reinforcing strip 21 in the region corresponding to each side end zone of the belt 2 in the widthwise direction is ⅔ of the strip width W likewise the front tire F, while the strip 21 is contacted at its side faces with each other in the portion corresponding to a central zone of the belt 2 in the widthwise direction to render the overlapping amount zero.

According to the second embodiment of the tire pair, the overlapping amount of the strip in the portion corresponding to a central zone of the belt 2 in the widthwise direction is different between the front tire F and the rear tire R. Hence the density of the cords arranged in the auxiliary belt at such a portion is different therebetween, so that the circumferential rigidity of the auxiliary belt 4 in the front tire F at the portion corresponding to the central zone of the belt in the widthwise direction is higher than that in the rear tire R likewise, the tire pair of FIG. 1.

Even in the second embodiment, therefore, the cornering performance of the front tire F and the road gripping force of the rear tire R are effectively improved, whereby the steering stability on dry and wet roads can largely be improved.

In a preferred embodiment, the overlapping amount of the auxiliary belt at the region corresponding to the side end zone of the belt in the rear tire is larger than that in the front tire and that the overlapping amount of the auxiliary belt at the region corresponding to the side end zone of the belt 2 is larger than that at the portion corresponding to the central zone of the belt 2 irrespective of the front and rear tires.

The following examples are given in illustration of the invention and are not intended as limitations thereof.

EXAMPLE 1

A comparative test on the steering stability on dry and wet roads and the ride comfortability was made with respect to a tire pair according to the invention shown in FIG. 1 and a conventional tire pair.

⊙ Tire size to be tested
Front tire: 225/45 ZR17
Rear tire: 255/40 ZR17

⊙ Tire pair according to the invention
In the front and rear tires, the carcass was comprised of two carcass plies each containing rayon cords of 1650d/2, while the belt 2 was comprised of two belt layers containing steel cords therein, in which the steel cords of these belt layers were crossed with each other at a cord angle of 25° with respect to the equatorial plane of the tire. Further, the auxiliary belt in the front tire had the structure shown in FIG. 1a, while that of the rear tire had the structure shown in FIG. 1b. In this case, each of the reinforcing layers constituting the auxiliary belt contained nylon cords of 1260d/2 as an organic fiber cord at an end count of 8 cords per 1 cm.

⊙ Conventional tire pair
Each of the front and rear tires had the same structure as in the tire pair according to the invention except that the auxiliary belt in the front and rear tires had the structure shown in FIG. 1b.

⊙ Test method
Each of the above tire pairs was actually mounted on a vehicle and run at an internal pressure of 2.5 kgf/cm² under an authorized payload of 70 kgf.

The steering stabilities on dry and wet roads were determined by a feeling evaluation when the tire was run on a dry road surface and on a wet road surface having a water depth of 2 mm at a transitional region from straight running to cornering and a limit region.

The ride comfortability was determined by a feeling evaluation when the tire was run on various road surfaces of concrete joint road, dip road, Belgian road and the like.

⊙ Test results
Each test result is indicated by an index value in the following Table 1.

Moreover, the larger the index value, the better the result.

TABLE 1

|  | Conventional tire pair | Invention tire pair |
| --- | --- | --- |
| Steering stability on dry road | 100 | 110 |
| Steering stability on wet road | 100 | 108 |
| Ride comfortability | 100 | 100 |

As seen from Table 1, in the tire pair according to the invention, the steering stability on dry and wet road surfaces can effectively be improved without damaging the ride comfortability on the vehicle.

EXAMPLE 2

⊙ Tire pair according to the invention
The basic reinforcing structures of the front and rear tires were the same as in Example 1 except that the auxiliary belt was formed by spirally winding a ribbon-shaped reinforcing rubberized strip containing 8 straight nylon cords (1260d/2) and having a width of 1 cm, in which the winding of the strip in the front tire was conducted as shown in FIG. 2a and the winding of the strip in the rear tire was conducted as shown in FIG. 2b.

⊙ Conventional tire pair
The same conventional tire pair as in Example 1 was used.

⊙ Test method and test results
When the same tests as in Example 1 were made with respect to these tire pairs, substantially the same results on the steering stability on dry and wet roads and the ride comfortability as in Example 1 were obtained.

In the tire pair according to the invention, the steering stability was sufficiently improved without sacrificing the ride comfortability on the vehicle.

As mentioned above, according to the invention, the excellent cornering performance based on high response is produced in the front tire and the excellent road gripping force based on high ground contact property is produced in the rear tire, whereby the excellent steering stability on dry and wet road surfaces can be developed without damaging the ride comfortability on the vehicle.

What is claimed is:

1. A pair of pneumatic radial tires for a vehicle having front tires and rear tires, said pair of tires comprising a vehicle front tire designated for mounting as one of said vehicle's front tires and a vehicle rear tire designated for mounting as one of said vehicle's rear tires, said designated front tire and said designated rear tire being of different sizes, with respect to each other, each of said designated front and designated rear tires of said pair comprising: a carcass of radial structure toroidally extending between a pair of bead rings; a primary belt arranged at an outer peripheral side of a crown portion of the carcass and comprised of plural belt layers each containing inextensible cords arranged at a relatively small cord angle and non-parallel to an equatorial plane of the tire; and an auxiliary belt arranged adjacent to an outer peripheral side of the primary belt and comprised of at least one reinforcing layer containing nylon cords arranged substantially in parallel with the equatorial plane of the tire; a circumferential rigidity of the auxiliary belt in the designated front tire at a portion corresponding to a central zone of the primary belt in widthwise direction thereof is larger than that of the auxiliary belt in the designated rear tire at a portion corresponding to a central zone of the primary belt in widthwise direction thereof.

2. The pair of pneumatic radial front and rear tires according to claim 1, wherein said circumferential rigidity of the auxiliary belt in the designated front tire at said portion corresponding to said central zone of the belt in widthwise direction thereof is larger by 1.5 to 3.0 times than that of the auxiliary belt in the designated rear tire at said portion corresponding to said central zone of the primary belt in widthwise direction thereof.

3. The pair of pneumatic radial front and rear tires according to claim 1, wherein said circumferential rigidity of the auxiliary belt at a region corresponding to each side end zone of the primary belt in said designated rear tire is made larger than that in said designated front tire.

4. The pair of pneumatic radial front and rear tires according to claim 1, wherein said circumferential rigidity of the auxiliary belt at a region corresponding to each side end zone of the primary belt in each of said designated front and rear tires is made larger than that at said portion corresponding to the central zone of the primary belt in widthwise direction thereof.

5. The pair of pneumatic radial front and rear tires according to claim 1, wherein said auxiliary belt in each of said designated front and rear tires is formed by spirally winding a ribbon-shaped reinforcing rubberized strip containing plural nylon cords therein and an overlapping amount of said strip in said designated front tire at a portion corresponding to the central zone of the primary belt in the widthwise direction is made larger than an overlapping amount of said strip in said designated rear tire at a portion corresponding to the central zone of the primary belt in the widthwise direction.

6. The pair of pneumatic radial front and rear tires according to claim 5, wherein said ribbon-shaped reinforcing strip having a width W in said designated front tire is overlapped at a width corresponding to $\frac{2}{3}$ of the strip width W in a region corresponding to each side edge zone of the primary belt in the widthwise direction and at a width corresponding to $\frac{1}{2}$ of the strip width W in a region corresponding to a central zone of the primary belt in the widthwise direction, while said ribbon-shaped reinforcing strip having a width W in said rear tire is overlapped at a width corresponding to $\frac{2}{3}$ of the strip width W in a region corresponding to each side edge zone of the primary belt in the widthwise direction and contacted at its side faces with each other in the region corresponding to a central zone of the belt in the widthwise direction to render the overlapping amount zero.

7. The pair of pneumatic radial front and rear tires according to claim 5, wherein said overlapping amount of said strip at said region corresponding to each side end zone of the primary belt in said designated rear tire is made larger than that in said designated front tire.

8. The pair of pneumatic radial front and rear tires according to claim 5, wherein said overlapping amount of said strip at said region corresponding to each side end zone of the primary belt in each of said designated front and rear tires is made larger than that at said portion corresponding to the central zone of the primary belt in widthwise direction thereof.

9. The pair of pneumatic radial front and rear tires according to claim 1, wherein said designated front tire has a width different from said designated rear tire.

10. The pair of pneumatic radial front and rear tires according to claim 1, wherein said cord angle is 25°.

* * * * *